(12) United States Patent
Yoshinori et al.

(10) Patent No.: US 6,179,706 B1
(45) Date of Patent: Jan. 30, 2001

(54) SEAT AIR CONDITIONER FOR VEHICLE

(75) Inventors: Takeshi Yoshinori, Okazaki; Shinji Aoki, Chiryu; Koichi Ban, Tokai, all of (JP)

(73) Assignee: Denso Corporation, Kariya (JP)

( * ) Notice: Under 35 U.S.C. 154(b), the term of this patent shall be extended for 0 days.

(21) Appl. No.: 09/332,724

(22) Filed: Jun. 14, 1999

(30) Foreign Application Priority Data

| Jun. 19, 1998 | (JP) | 10-173518 |
| Nov. 19, 1998 | (JP) | 10-329579 |
| Feb. 1, 1999 | (JP) | 11-023435 |

(51) Int. Cl.⁷ .................................................. A47C 7/74
(52) U.S. Cl. ...................... 454/120; 297/180.14; 454/907
(58) Field of Search .................................. 454/120, 907; 297/180.1, 180.13, 180.14

(56) References Cited

U.S. PATENT DOCUMENTS

| 2,826,135 | * | 3/1958 | Benzick | 454/120 |
| 2,826,244 | * | 3/1958 | Hurley | 297/180.14 X |
| 5,597,200 | * | 1/1997 | Gregory et al. | 297/180.13 |
| 5,645,314 | * | 7/1997 | Liou | 297/180.14 |
| 6,059,018 | * | 5/2000 | Yoshinori et al. | 454/120 X |

FOREIGN PATENT DOCUMENTS

Y2-4-45929   10/1992   (JP) .

* cited by examiner

*Primary Examiner*—Harold Joyce
(74) *Attorney, Agent, or Firm*—Harness, Dickey & Pierce, PLC

(57) ABSTRACT

A seat air conditioner for a vehicle has a seat having a pad and a blower unit for forcibly blowing conditioned air toward the seat. The pad has an introduction passage for introducing blown air toward a surface of the pad, plural distribution passages communicating with and radially extending from the introduction passage and plural communication passages causing communication among the distribution passages. Each of the distribution passages and the communication passages is formed as a groove in the surface of the pad. Therefore, even when a passenger is seated on the seat, air does not stagnate but flows into the distribution passages extending outside a portion of the seat which contacts with the passenger through the communication passages. As a result, air is smoothly blown out from the seat, and the passenger immediately feels sufficiently warm and comfortable.

23 Claims, 11 Drawing Sheets

SEAT AIR CONDITIONER FOR VEHICLE

BACKGROUND OF THE INVENTION

1. Field of the Invention

The present invention relates to a seat air conditioner for a vehicle which supplies conditioned air to a seat of the vehicle.

2. Related Art

JP-Y2-4-45929 discloses a forced ventilation seat for a vehicle. The seat has an air permeable pad having an air chamber in a lower part thereof. Conditioned air from a front air conditioning unit of the vehicle flows into the air chamber of the pad, and is blown out from a surface of the pad toward a passenger.

However, in the above-mentioned seat, the pad needs to have relatively high air permeability. Therefore, the pad may not have sufficient hardness nor soft touch. As a result, when the passenger is seated on the seat, the pad is heavily squashed by seating pressure of the passenger, and the passenger may have difficulty in maintaining his or her seating posture. Further, when the pad is squashed, ventilation resistance of conditioned air in the pad is increased. As a result, amount of conditioned air to be blown out from the seat may be decreased.

Referring to FIGS. 12, 13, a seat air conditioner for a vehicle in which a pad of a seat is restricted from being squashed is disclosed to cope with these problems. As shown in FIG. 12, a seat of the seat air conditioner has a pad 100 made of material having sufficient hardness such as urethane. An introduction passage 110 for introducing conditioned air to the pad 100 and plural distribution passages 120 are formed inside the pad 100. Each of the distribution passage 120 extends from the introduction passage 110 to a surface of the seat. Further, plural air outlets 130 are formed to be opened in the surface of the seat so that each of the air outlets 130 communicates with each of the distribution passages 120.

However, as shown in FIG. 13, when a passenger is seated on the seat, most of the air outlets 130 are blocked by the passenger. Therefore, conditioned air in the distribution passages 120 stagnates and is not blown out smoothly. As a result, the seat air conditioner can not provide the passenger with sufficient warmth and comfort. Further, each of the distribution passages 120 extends from a lower part to an upper part of the seat. Therefore, when conditioned air flows through the distribution passages 120, heat loss of conditioned air is relatively large. As a result, the seat air conditioner can not provide an immediate effect.

SUMMARY OF THE INVENTION

In view of the foregoing problems, it is an object of the present invention to provide a seat air conditioner for a vehicle which immediately provides a passenger seated thereon with sufficient warmth and comfort.

It is another object of the present invention to provide a seat air conditioner for a vehicle which has less air heat loss and provides a passenger seated thereon with sufficient warmth and comfort.

According to the present invention, a seat air conditioner for a vehicle has a seat and a blower unit for forcibly blowing conditioned air toward the seat. The seat has a shock absorbing member having an air passage and an air permeable seat surface member disposed on a surface of the shock absorbing member. The air passage includes an introduction passage for introducing blown air toward the surface of the shock absorbing member, plural distribution passages communicating with the introduction passage and a communication passage causing communication among at least two of the distribution passages. Each of the distribution passages and the communication passage is formed on the surface of the shock absorbing member. Therefore, air smoothly flows into each distribution passages through the communication passages without stagnation. As a result, air is smoothly blown out from a surface of the seat. Further, blown air is directly introduced toward the surface of the shock absorbing member through the introduction passage, and then flows into each of the distribution passages. Therefore, heat loss of air while flowing through the distribution passages is reduced.

Preferably, at least one of the distribution passages extends outside a passenger contact portion of the surface of the seat which contacts with a passenger seated on the seat. Therefore, even when the passenger is seated on the seat, air is smoothly blown out from the downstream air end of the distribution passage extending outside the passenger contact portion. As a result, the passenger immediately feels sufficiently warm and comfortable.

According to another aspect of the present invention, a seat air conditioner for a vehicle has a seat having an air passage and a blower unit for forcibly blowing air toward the seat. The air passage includes an introduction passage having a communication hole and plural distribution passages communicating with the introduction passage through the communication hole and outwardly extending from the communication hole. At least one downstream air end of the distribution passages is opened in a side surface of the seat. Further, the communication hole is disposed at a portion of the seat to which seating pressure of a passenger seated on the seat is applied. Therefore, when the passenger is seated on the seat, air is not directly blown out from the communication hole, but is distributed to a whole surface of the seat through the distribution passages. As a result, the surface of the seat has uniform temperature and the passenger feels sufficiently warm and comfortable.

Preferably, the distribution passages extend substantially linearly. As a result, heat loss of air while flowing through the distribution passages is reduced.

BRIEF DESCRIPTION OF THE DRAWINGS

This and other objects and features of the present invention will become more readily apparent from a better understanding of the preferred embodiments described below with reference to the accompanying drawings, in which.

DETAILED DESCRIPTION OF THE PREFERRED EMBODIMENTS

Preferred embodiments of the present invention is described hereinafter with reference to the accompanying drawings.

First Embodiment

Figure 1:
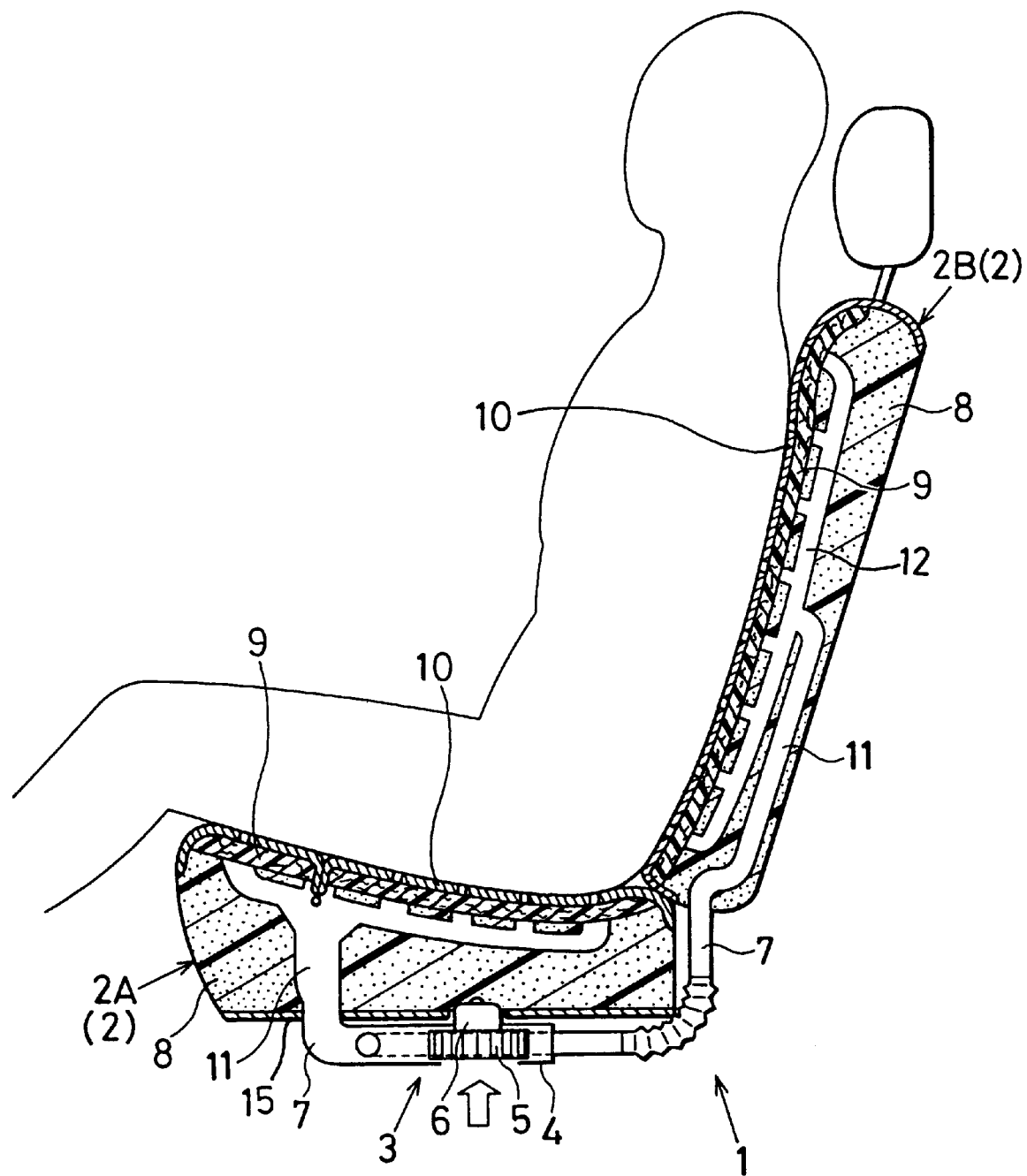
FIG. 1 is a cross-sectional view showing a seat air conditioner for a vehicle with a passenger seated thereon according to a first preferred embodiment of the present invention.

A first preferred embodiment of the present invention will be described with reference to FIGS. 1–4. As shown in FIG. 1, a seat air conditioner 1 for a vehicle according to the first embodiment has a seat 2 (e.g., front seat) and a blower unit 3 for forcibly blowing air toward the seat 2. The seat 2 consists of a seat cushion 2A for holding hips and thighs of a passenger and a seat back 2B for holding a waist and a back of the passenger. The blower unit 3 is connected to a conventional air conditioning unit (not shown) mounted on the vehicle through a duct (not shown). The blower unit 3 sucks conditioned air flowing into the duct from the air conditioning unit, and forcibly blows the conditioned air toward the seat 2. The blower unit 3 has a fan case 4 for forming an air passage, a centrifugal fan 5 accommodated in the fan case 4, a motor 6 for rotating the fan 5 and an air duct 7 for supplying air to the seat cushion 2A and the seat back 2B.

Each of the seat cushion 2A and the seat back 2B has an urethane pad 8 (i.e., shock absorbing member). The pad 8 has a sponge layer 9 disposed on an upper surface thereof. The sponge layer 9 is further covered by a seat cover 10 (i.e., seat surface member) made of leather, moquette or the like. The seat cushion 2A is held by a seat support member 15, which is made of metal or the like and is disposed below the pad 8.

Figure 2:
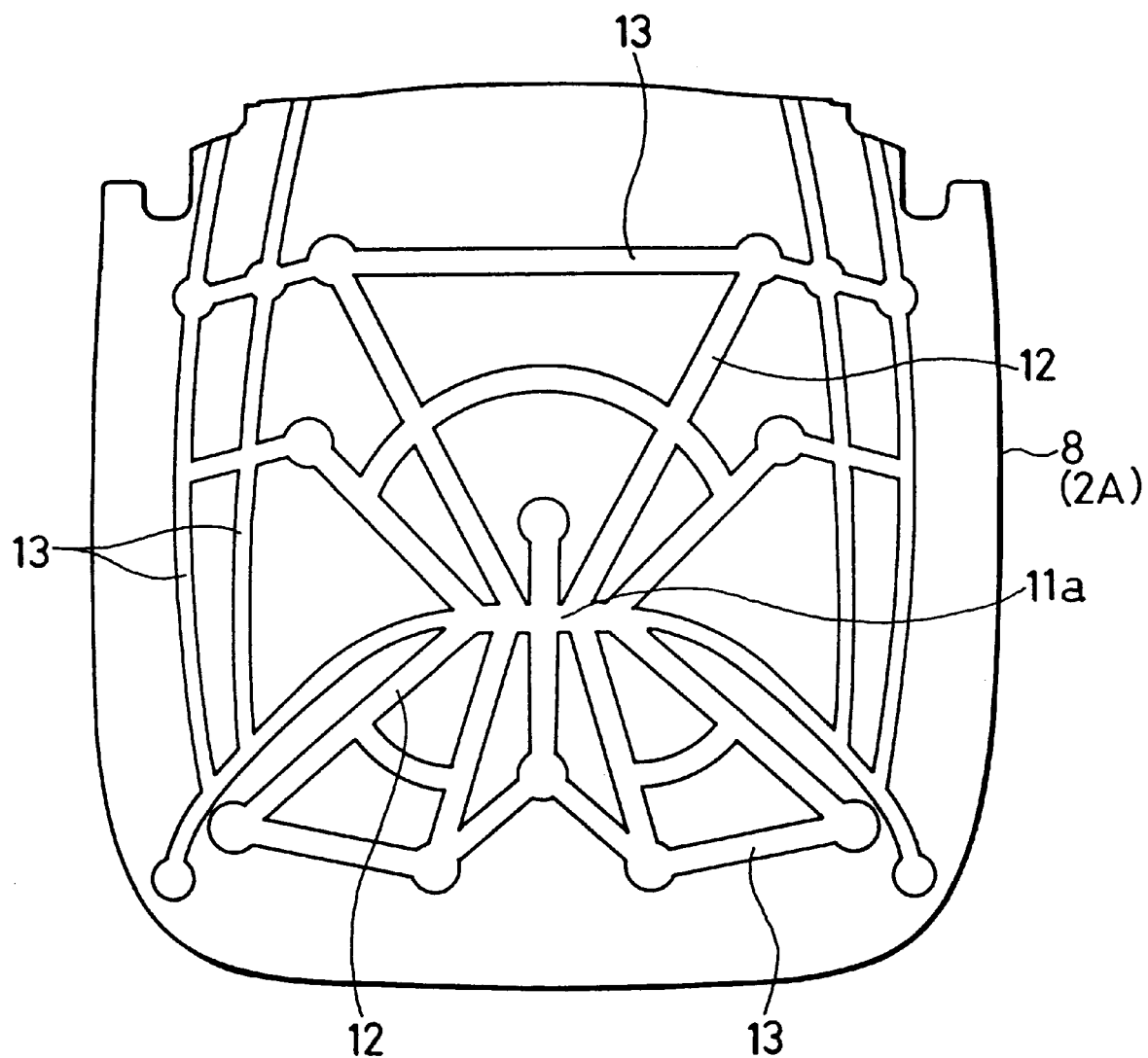
FIG. 2 is a plan view showing a pattern of distribution passages and communication passages in a seat cushion of the seat air conditioner according to the first embodiment.

In both the seat cushion 2A and the seat back 2B, plural air passages through which conditioned air flows are formed in the pad 8. As shown in FIGS. 1 and 2, the air passages are an introduction passage 11, plural distribution passages 12 and plural communication passages 13.

The introduction passage 11 introduces conditioned air blown by the blower unit 3 into the pad 8. As shown in FIG. 1, each of the seat cushion 2A and the seat back 2B has one introduction passage 11. In the first embodiment, the introduction passage 11 is made from a polypropylene pipe. An upstream air end of the introduction passage 11 is connected to the air duct 7 of the blower unit 3, and a downstream air end of the introduction passage 11 is opened in a surface of the pad 8, thereby forming a downstream air end opening 11a. The air duct 7 of the blower unit 3 is divided into two portions at an air outlet of the fan case 4. One portion of the air duct 7 is connected to the introduction passage 11 in the seat cushion 2A, and the other portion of the air duct 7 is connected to the introduction passage 11 in the seat back 2B.

Figure 3:
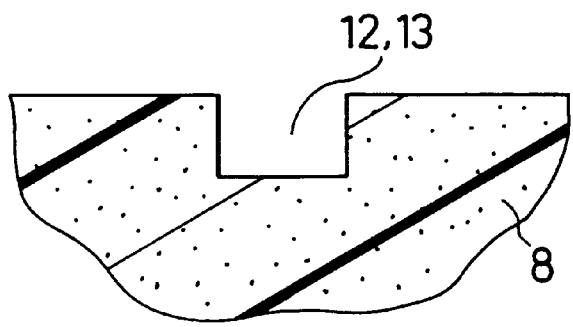
FIG. 3 is a cross-sectional view showing the distribution passage and the communication passage of the seat air conditioner according to the first embodiment.

As shown in FIG. 2, each of the distribution passages 12 is formed as a groove in the surface of the pad 8, and radially extends from the downstream air end opening 11a of the introduction passage 11. Each of the communication passages 13 is also formed as a groove in the surface of the pad 8 to cause communication among the distribution passages 12. As shown in FIG. 3, in the first embodiment, each of the distribution passages 12 and the communication passages 13 has 10 mm in width and 20 mm in depth. Although FIG. 2 shows only the air passages of the seat cushion 2A, the seat back 2B also has the air passages similar to that of the seat cushion 2A.

Figure 4:
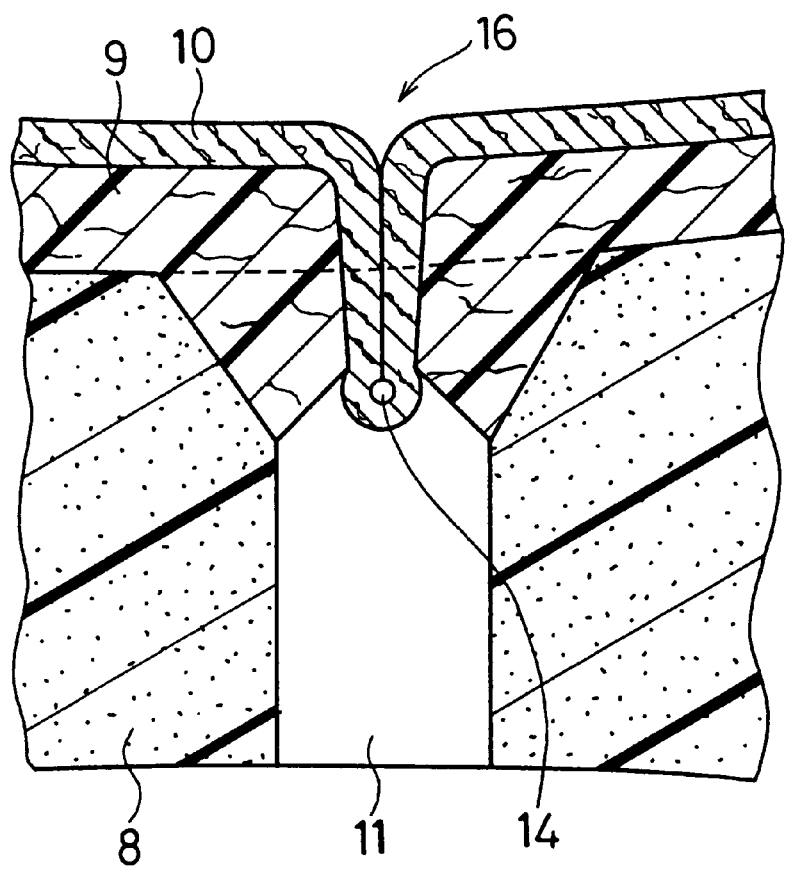
FIG. 4 is a cross-sectional view showing a recessed portion of the seat air conditioner according to the first embodiment.

The sponge layer 9 is used to improve air permeability of the seat 2 and seating feeling of the passenger seated on the seat 2. Since the sponge layer 9 already has an excellent air permeability, no additional air passage or ventilation hole is provided in the sponge layer 9. When the seat cover 10 is made of leather, plural ventilation holes need to be formed in the seat cover 10. However, when the seat cover 10 is made of highly air permeable material such as moquette, no additional ventilation hole is needed to be formed in the seat cover 10. Further, as shown in FIG. 4, a part of the seat cover 10 is squeezed into the seat 2, thereby forming a recessed portion 16 of the seat 2. In the first embodiment, the downstream air end opening 11a of the introduction passage 11 is disposed at the recessed portion 16.

Next, operation of the seat air conditioner 1 according to the first embodiment of the present invention will be described.

Conditioned air from the air conditioning unit is sucked and forcibly blown by the blower unit 3 toward the seat cushion 2A and the seat back 2B through the air duct 7. In the seat cushion 2A and the seat back 2B, air flows from the introduction passage 11 to the distribution passages 12 and the communication passages 13. Finally, air flows upwardly through the sponge layer 9 and is blown out through the seat cover 10 toward the passenger.

When the passenger is seated on the seat 2, the distribution passages 12 disposed at a portion of the seat cushion 2A and the seat back 2B which contacts the passenger (hereinafter referred to as passenger contact portion) is blocked by the passenger. As a result, conditioned air cannot be directly blown out upwardly from the distribution passages 12 disposed at the passenger contact portion. However, in the first embodiment, the distribution passages 12 communicate with each other through the communication passages 13. Therefore, air does not stagnate in the distribution passages 12 disposed at the passenger contact portion, but flows into the distribution passages 12 extending outside the passenger contact portion through the communication passages 13. As a result, air is sufficiently blown out from the distribution passages 12 extending outside the passenger contact portion.

According to the first embodiment, the distribution passages 12 communicate with each other through the communication passages 13. Therefore, even when the passenger is seated on the seat 2, air does not stagnate in the distribution passages 12 disposed at the passenger contact portion, but flows into the distribution passages 12 extending outside the passenger contact portion through the communication passages 13. As a result, air is sufficiently blown out from the distribution passages 12 extending outside the passenger contact portion, and the seat air conditioner 1 immediately provides the passenger with sufficient warmth and comfort.

Further, according to the first embodiment, the distribution passages 12 are formed as grooves in the surface of the pad 8 of the seat 2. That is, the distribution passages 12 are formed adjacent to the surface of the seat 2. Therefore, heat loss of air while flowing through the distribution passages 12 is reduced in comparison with a conventional seat air conditioner in which distribution passages are formed to extend from a lower part to an upper part of a seat. Furthermore, the downstream air end opening 11a of the introduction passage 11 is disposed at the recessed portion 16 of the seat 2 where the seat cover 10 is squeezed into the seat 2. Therefore, the passenger seated on the seat 2 is restricted from feeling uncomfortable.

Second Embodiment

Figure 5:
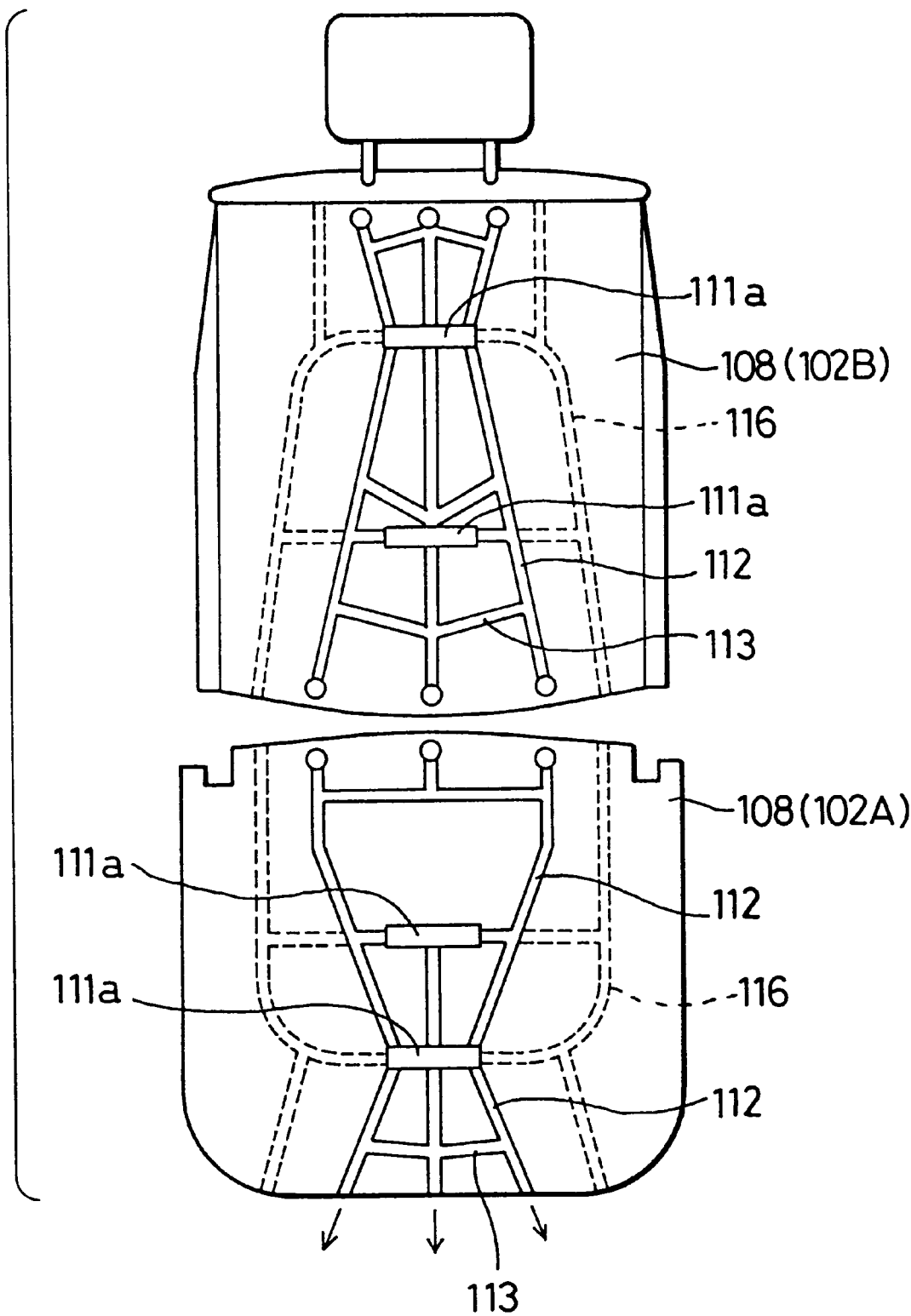
FIG. 5 is a plan view showing a pattern of distribution passages and communication passages in a seat cushion and a seat back of a seat air conditioner for a vehicle according to a second preferred embodiment of the present invention.

A second preferred embodiment of the present invention will be described with reference to FIGS. 5 and 6. In this and the following embodiments, components which are similar to those in the first embodiment are indicated with the same reference numerals, and the explanation thereof will be omitted.

In the second embodiment, conditioned air is more efficiently blown out from a seat cushion 102A of a seat 102 in a front-rear direction thereof, and from a seat back 102B of the seat 102 in an up-down direction thereof. As shown in FIG. 5, an urethane pad 108 of the seat cushion 102A has plural distribution passages 112 extending toward front and rear ends of the pad 108. Further, each downstream air end of distribution passages 112 extending to the front end of the pad 108 is opened in a front side surface of the pad 108. An urethane pad 108 of the seat back 102B also has plural distribution passages 112 extending toward upper and lower ends of the pad 108.

Figure 6:
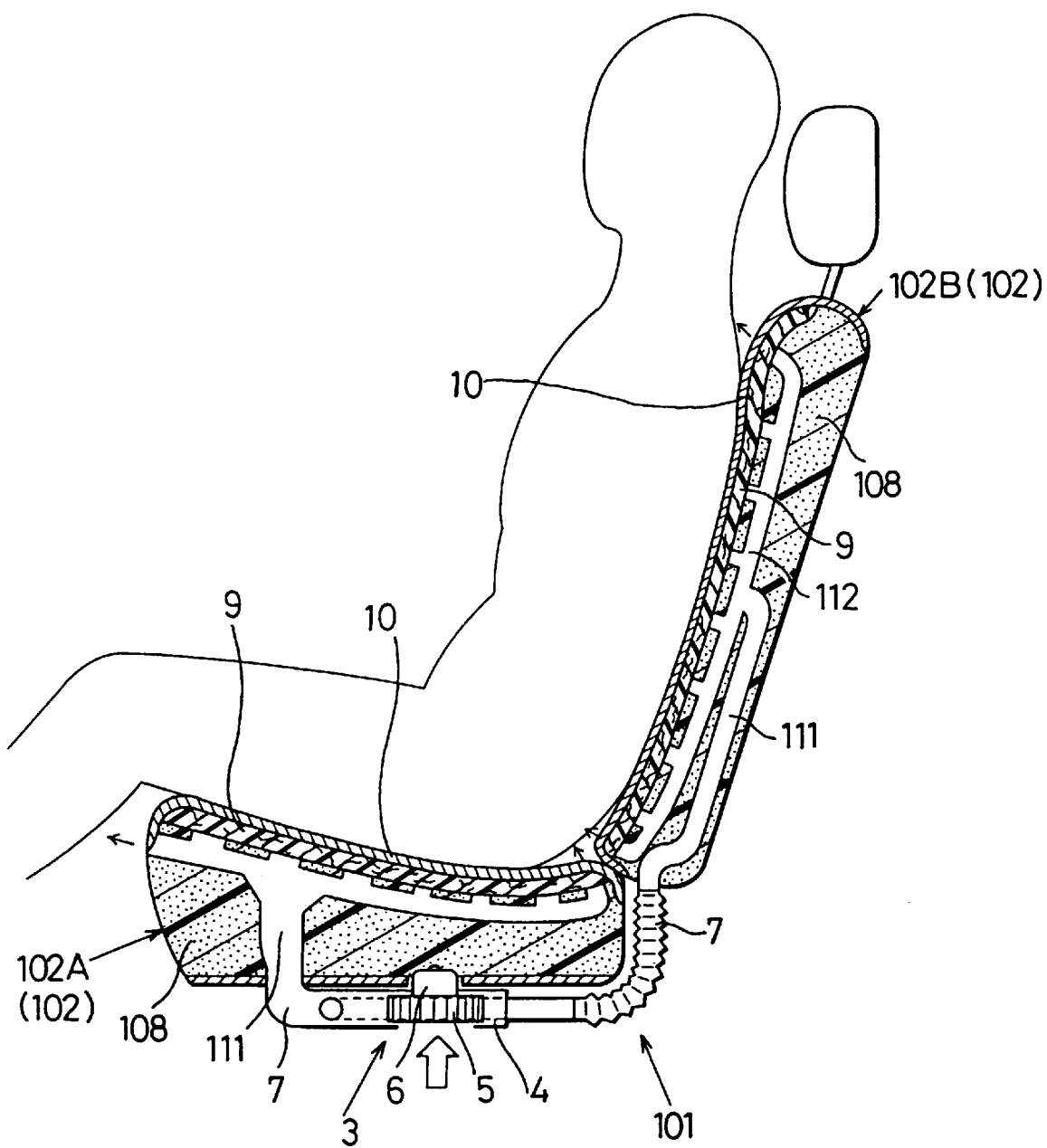
FIG. 6 is a cross-sectional view showing the seat air conditioner with a passenger seated thereon according to the second embodiment.

In the second embodiment, as shown in FIG. 6, conditioned air is efficiently blown out toward a passenger seated on the seat 102 from the distribution passages 112 extending toward the front and rear ends of the seat cushion 102A, and from the distribution passages 112 extending toward the upper and lower ends of the seat back 102B.

In the seat cushion 102A, air is blown out from each downstream air end opening of the distribution passages 112 formed in the front side surface of the pad 108 toward calves of the passenger directly or through the seat cover 10. Further, air is blown out from each downstream air end of the distribution passages 112 extending to the rear end of the pad 108 toward hips and a waist of the passenger through the seat cover 10.

In the seat back 102B, air is blown out from each downstream air end of the distribution passages 112 extending to the upper end of the pad 108 toward shoulders and a neck of the passenger through the seat cover 10. Further, air is blown out from each downstream air end of the distribution passages 112 extending to the lower end of the pad 108 toward the hips and the waist of the passenger through the seat cover 10.

According to the second embodiment, even when the passenger is seated on the seat 102, conditioned air is efficiently blown out from the front and rear ends of the seat cushion 102A and from the upper and lower ends of the seat back 102B toward the passenger. As a result, the seat air conditioner 101 provides improved air conditioning performance.

When the distribution passage 112 is formed to cross a recessed portion 116 of the seat 102, in which the seat cover 10 is squeezed into the seat 102 and is engaged with the wire 14, the distribution passage 112 may need to be formed to go under the wire 14 to avoid the recessed portion 116. As a result, flow resistance of air flowing through the distribution passage 102 is increased, thereby restricting air from being blown out smoothly from the seat 102. However, in the second embodiment, as shown in FIG. 5, plural downstream air end openings 111a of an introduction passage 111 from which the distribution passages 112 extend are disposed at the recessed portion 116 of the seat 102. As a result, the distribution passage 112 does not need to be formed to cross the recessed portion 116, thereby solving the above-mentioned problems.

Third Embodiment

Figure 7:
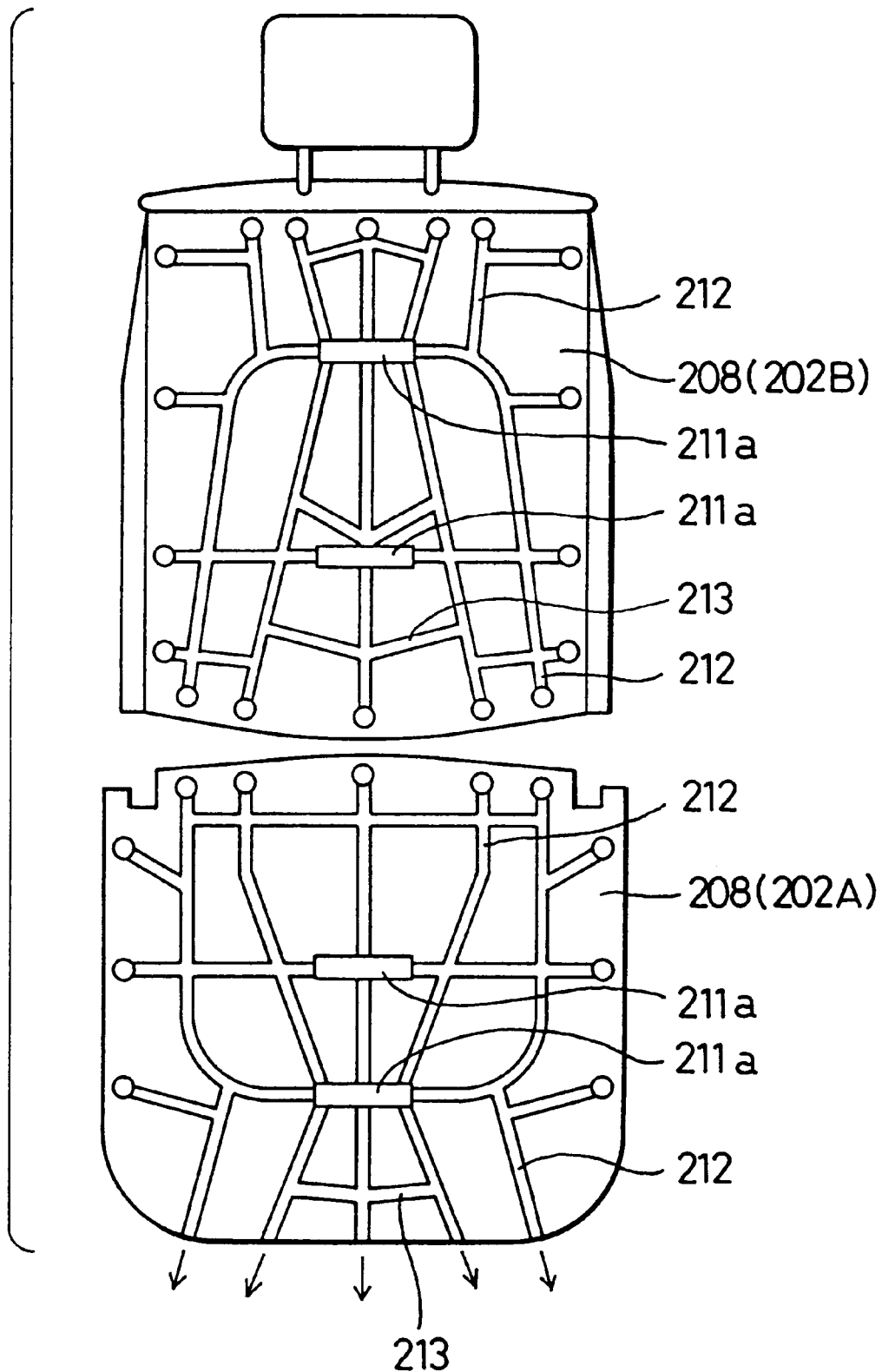
FIG. 7 is a plan view showing a pattern of distribution passages and communication passages in a seat cushion and a seat back of a seat air conditioner for a vehicle according to a third preferred embodiment of the present invention.

A third preferred embodiment of the present invention will be described with reference to FIG. 7. In the third embodiment, conditioned air is blown out more efficiently from a seat cushion 202A of a seat 202 not only in a front-rear direction thereof but also in a right-left direction thereof, and from a seat back 202B of the seat 202 not only in an up-down direction thereof but also in a right-left direction thereof.

In the third embodiment, an urethane pad 208 of the seat cushion 202A has plural distribution passages 212 extending toward front and rear ends of the pad 208 and plural distribution passages 212 extending toward left and right ends of the pad 208. On the other hand, an urethane pad 208 of the seat back 202B has plural distribution passages 212 extending toward upper and lower ends of the pad 208 and plural distribution passages 212 extending toward right and left ends of the pad 208.

According to the third embodiment, following effects are obtained in addition to the effects obtained in the second embodiment. That is, in the seat cushion 202A, conditioned air is blown out from each downstream air end of the distribution passages 212 extending to the right and left ends of the pad 208 toward thighs of a passenger seated on the seat 202 through the seat cover 210. In the seat back 202B, conditioned air is blown out from each downstream air end of the distribution passages 212 extending to the right and left ends of the pad 208 toward right and left body sides and a side waist of the passenger through the seat cover 210.

Thus, in the third embodiment, even when the passenger is seated on the seat 202, conditioned air is efficiently blown out from front, rear, right and left ends of the seat cushion 202A and upper, lower, right and left ends of the seat back 202B toward the passenger. Therefore, the seat air conditioner 201 provides further improved air conditioning performance. Further, in the third embodiment, downstream air end openings 211a of an introduction passage 211 are disposed at a recessed portion (not shown) of the seat 202, similarly to the second embodiment. Therefore, the similar effect as in the second embodiment is obtained in the third embodiment.

Fourth Embodiment

Figure 8:
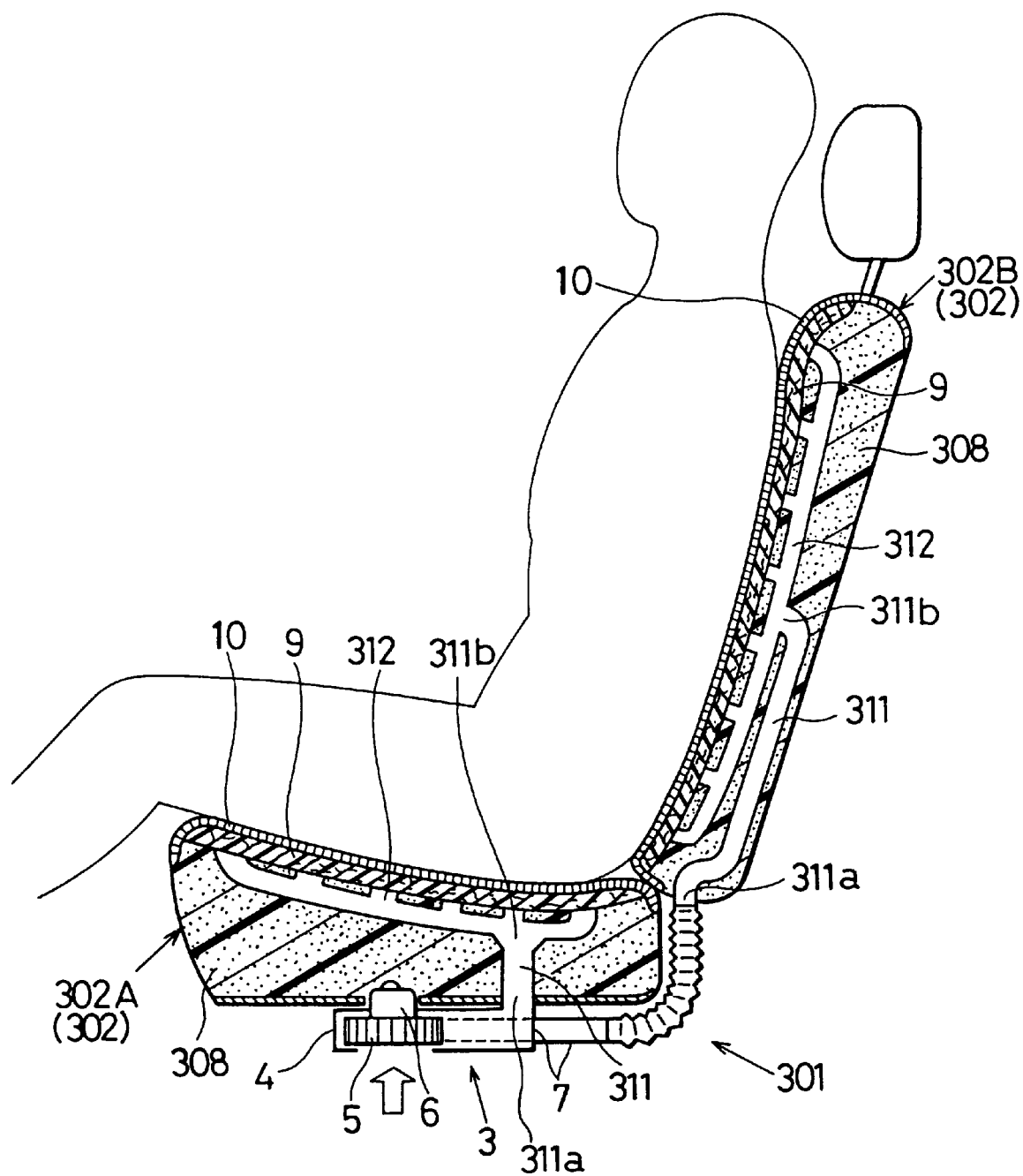
FIG. 8 is a cross-sectional view showing a seat air conditioner for a vehicle with a passenger seated thereon according to a fourth preferred embodiment of the present invention.

A fourth preferred embodiment of the present invention will be described with reference to FIGS. 8–11. In the fourth embodiment, as shown in FIG. 8, a seat air conditioner 301 has a seat 302 consisting of a seat cushion 302A and a seat back 302B. An introduction passage 311 has an upstream air end opening 311a through which the introduction passage 311 communicates with the air duct 7, and a downstream air end opening 311b through which the introduction passage 311 communicates with plural distribution passages 312. Further, the downstream air end opening 311b is disposed at a portion of the seat 302 to which seating pressure of the passenger is applied. That is, the downstream air end opening 311b is disposed at a portion of the seat cushion 302A which holds hips of the passenger, and is disposed at a portion of the seat back 302B which holds a back of the passenger.

Figure 9:
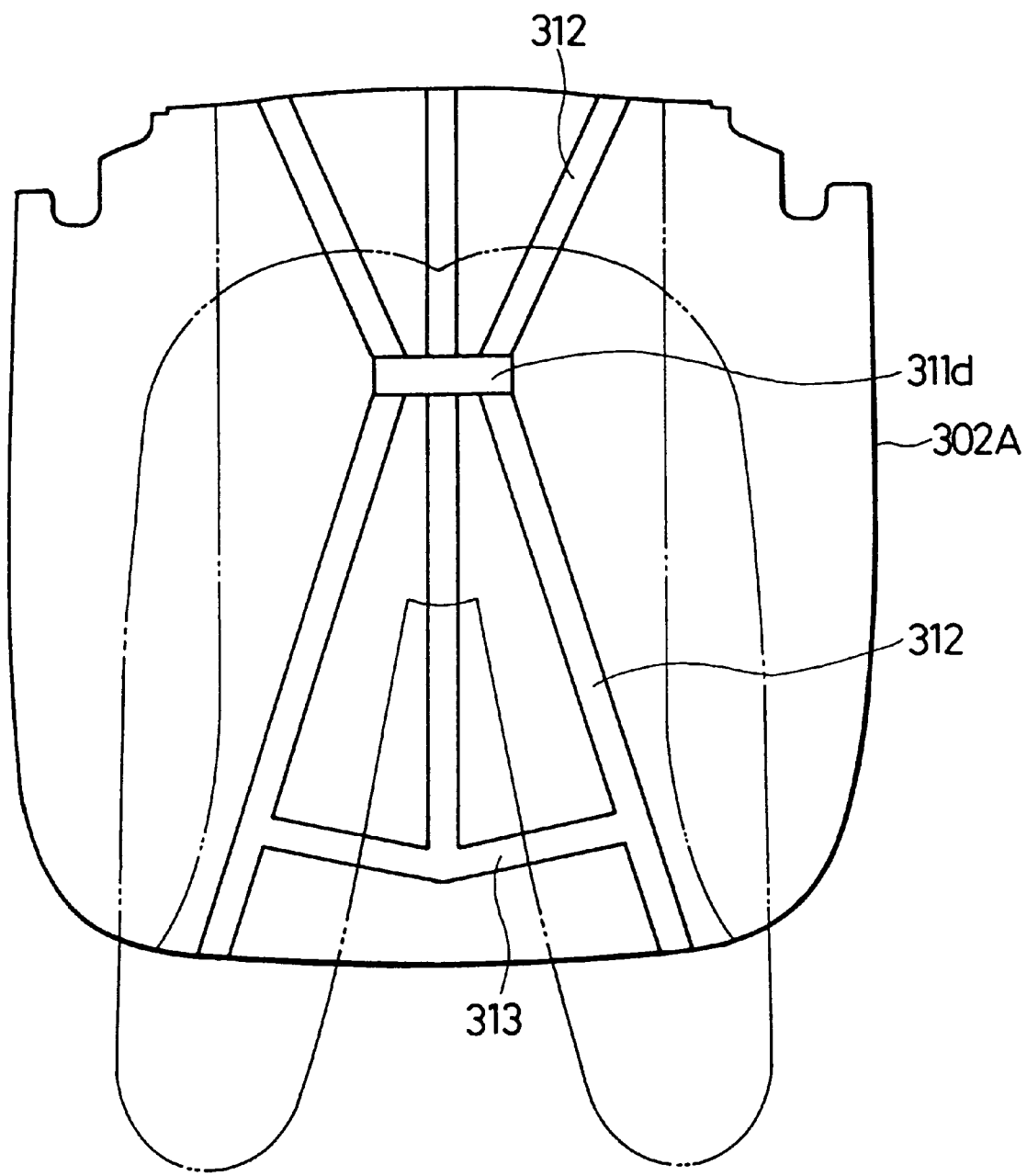
FIG. 9 is a plan view showing a pattern of distribution passages and a communication passage in a seat cushion of the seat air conditioner according to the fourth embodiment.

As shown in FIG. 9, in the seat cushion 302A, the distribution passages 312 substantially linearly extend from the downstream air end opening 311b of the introduction passage 311 to front and rear ends of the seat cushion 302A (i.e., extend in an up-down direction in FIG. 9). Further, each downstream air end of the distribution passages 312 is opened in a front or rear side surface of the seat cushion 302A. Furthermore, the distribution passages 312 extending to the front end of the seat cushion 302A communicate with each other through a communication passage 313 which extends in a lateral direction of the seat cushion 302A.

Figure 10:
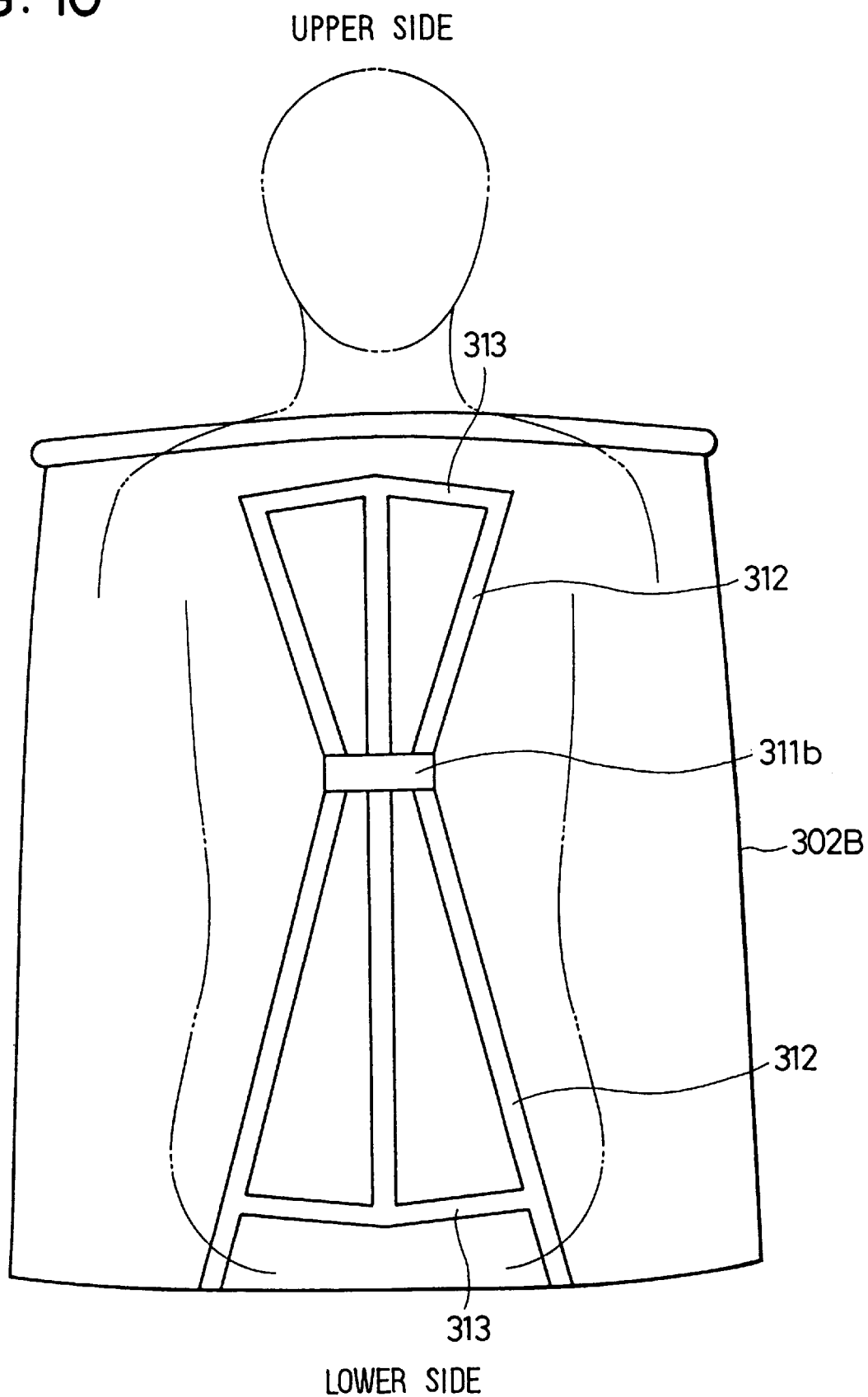
FIG. 10 is a plan view showing a pattern of distribution passages and communication passages in a seat back of the seat air conditioner according to the fourth embodiment.

As shown in FIG. 10, in the seat back 302B, the distribution passages 312 substantially linearly extend from the downstream air end opening 311b of the introduction passage 311 to upper and lower ends of the seat back 302B (i.e., extend in an up-down direction in FIG. 10). Further, the distribution passages 312 extending to the upper and lower ends of the seat back 302B respectively communicate with each other through the communication passage 313 which extends in a lateral direction of the seat back 302B. Each downstream air end of the distribution passages 312 may be opened in an upper or lower side surface of the seat back 302B, similarly to the seat cushion 302A.

Similarly to first through third embodiments, each of distribution passages 312 and communication passages 313 is formed as a groove in a surface of an urethane pad 308 of the seat cushion 302A and the seat back 302B as shown in FIG. 3.

According to the fourth embodiment, the downstream air end opening 311b of the introduction passage 311 is disposed at the portion of the seat 302 to which seating pressure of the passenger is applied. That is, the downstream air end opening 311b is blocked by the passenger when the passenger is seated on the seat 302. Therefore, air in the introduction passage 311 is restricted from directly being blown out from the downstream air end opening 311b, but is distributed into each of the distribution passages 312 which distribute air to a whole surface of the seat 302. As a result, the surface of the seat 302 has uniform temperature.

Further, as shown in FIGS. 9 and 10, in the fourth embodiment, a pattern of the distribution passages 312 is more linear-like and simpler in comparison with the first through third embodiments. Therefore, heat loss of conditioned air while flowing through the distribution passages 312 is reduced in comparison with the first through third embodiments. Further, in the fourth embodiment, each downstream air end of the distribution passages 312 is opened in the front or rear side surfaces of the seat cushion 302A. Therefore, conditioned air from the downstream air end opening 311b is more smoothly flows through the distribution passages 312. As a result, the passenger seated on the seat 302 immediately feels warm and comfortable sufficiently.

Figure 11:
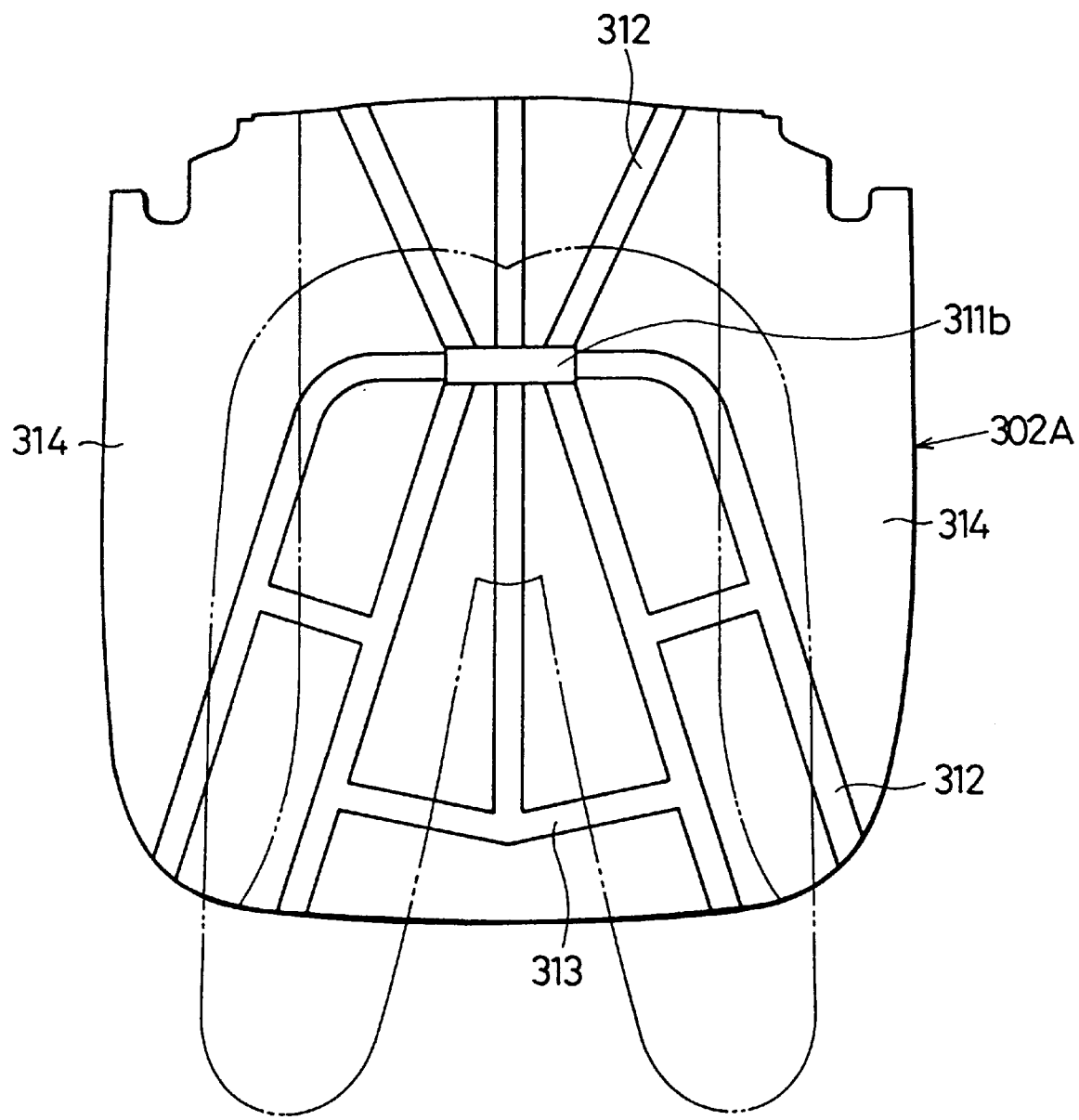
FIG. 11 is a plan view showing a pattern of the distribution passages and the communication passages in the seat cushion of the seat air conditioner according to a modification of the fourth embodiment.
Figure 12:
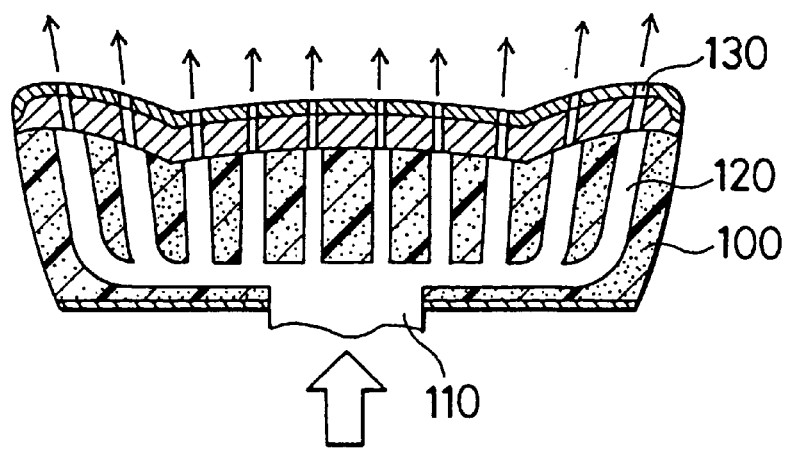
FIG. 12 is a cross-sectional view showing a conventional seat air conditioner for a vehicle.
Figure 13:
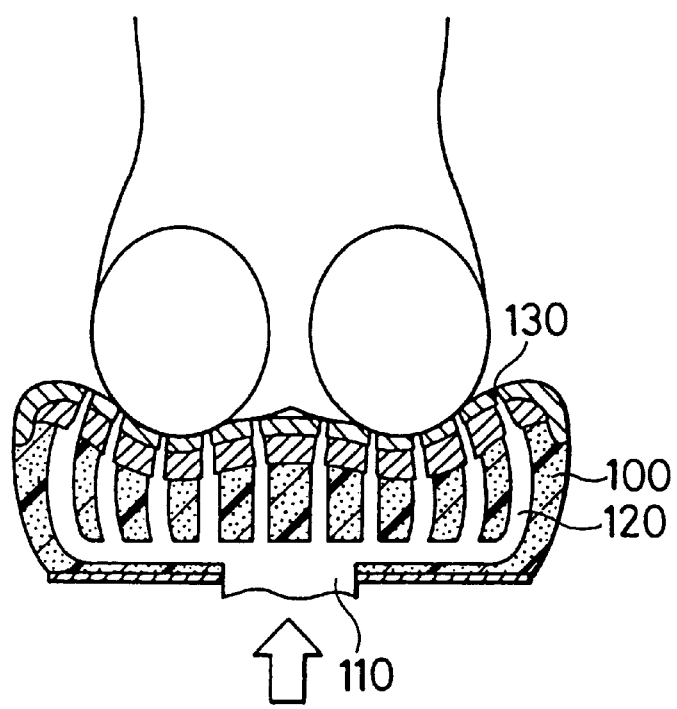
FIG. 13 is a cross-sectional view showing the seat air conditioner in FIG. 12 with a passenger seated thereon.

According to a modification of the fourth embodiment, as shown in FIG. 11, the distribution passages 312 may be extended toward right and left sides in the seat cushion 302A so that air is distributed to right and left side rising portions 314 of the seat cushion 302A. Similarly, the distribution passages 312 may also be extended toward right and left sides in the seat back 302B so that air is distributed to right and left side rising portions 314 (not shown) of the seat back 302B.

In the above-mentioned first through fifth embodiments, an electric heater may be additionally used as an auxiliary heating source for the seat air conditioner 1.

Further, the blower unit 3 may have a structure for blowing conditioned air toward a passenger seated on a rear seat. In this case, conditioned air may be selectably blown toward the seat air conditioner 1 and the rear seat by switching a door or the like.

Furthermore, the duct connecting the air conditioning unit and the blower unit 3 may be formed using a conventional rear foot duct which supplies warm air toward a foot area of a passenger seated on a rear seat.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A seat air conditioner for a vehicle comprising:
a seat including a shock absorbing member having an air passage through which air flows, and an air permeable seat surface member disposed on a surface of said shock absorbing member; and
a blower unit for blowing air into said air passage, wherein said air passage includes:
plural distribution passages formed on said surface of said shock absorbing member,
an introduction passage through which air blown by said blower unit is introduced into said plural distribution passages, and
a communication passage formed on said surface of said shock absorbing member through which at least two of said distribution passages communicate with each other, wherein:
said seat has a recessed portion in which said seat surface member is bent and is inserted into an inner side of said seat to have a tip portion in said seat;
said introduction passage has a communication hole through which said introduction passage communicates with said plural distribution passages; and
said communication hole is provided in said shock absorbing member at a position where said tip portion of said recessed portion is provided.

2. The seat air conditioner according to claim 1, wherein said seat surface member has plural ventilation holes.

3. The seat air conditioner according to claim 1, wherein:
said seat includes a seat cushion for holding hips and thighs of a passenger seated on said seat and a seat back for holding a back and a waist of the passenger;
each of said seat cushion and said seat back has a passenger contact portion which contacts with the passenger; and
at least one of said distribution passages extends outside said passenger contact portion.

4. The seat air conditioner according to claim 3, wherein:
at least one of said distribution passages in said seat cushion extends to have an air outlet in a front side surface of said shock absorbing member of said seat cushion; and
air is blown out from said air outlet directly toward calves of the passenger.

5. The seat air conditioner according to claim 3, wherein:
at least one of said distribution passages in said seat cushion extends to have an air outlet in a front side surface of said shock absorbing member of said seat cushion; and air is blown out from said air outlet toward the calves of the passenger through said seat surface member.

6. The seat air conditioner according to claim 3, wherein:

at least one of said distribution passages in said seat cushion extends to have an air outlet at a rear end of said shock absorbing member of said seat cushion; and air is blown out from said air outlet toward hips and a waist of the passenger through said seat surface member.

7. The seat air conditioner according to claim 3, wherein:

at least one of said distribution passages in said seat cushion extends to have an air outlet at right and left ends of said shock absorbing member of said seat cushion; and air is blown out from said air outlet toward thighs of the passenger through said seat surface member.

8. The seat air conditioner according to claim 3, wherein:

at least one of said distribution passages in said seat back extends to have an air outlet at a lower end of said shock absorbing member of said seat back; and air is blown out from said air outlet toward hips and a waist of the passenger through said seat surface member.

9. The seat air conditioner according to claim 3, wherein:

at least one of said distribution passages in said seat back extends to have an air outlet at an upper end of said shock absorbing member of said seat back; and air is blown out from said air outlet toward shoulders and a neck of the passenger through said seat surface member.

10. The seat air conditioner according to claim 3, wherein:

at least one of said distribution passages in said seat back extends to have an air outlet at right and left ends of said shock absorbing member of said seat back; and air is blown out from said air outlet toward right and left sides and a side waist of the passenger through said seat surface member.

11. The seat air conditioner according to claim 1, wherein said shock absorbing member is made of urethane.

12. The seat air conditioner according to claim 1, wherein each of said distribution passages and said communication passage is formed into a groove having a width of 10 mm and a depth of 20 mm.

13. The seat air conditioner according to claim 1, wherein:

in said recessed portion, said seat surface member is bent and inserted into said seat to have opposite surfaces in said seat; and said opposite surfaces of said seat surface member are joined to have a join part at least at said tip portion.

14. A seat air conditioner for a vehicle comprising:

a seat having an air passage through which air flows; and a blower unit for blowing air toward a surface of said seat via said air passage, wherein said air passage includes:

plural distribution passages extending along said surface of said seat to be adjacent to said surface of said seat, and an introduction passage having a communication hole through which said introduction passage communicates with said distribution passages so that said blown air is introduced into said distribution passages;

said distribution passages extend outwardly from said communication hole;

at least one downstream air end of said distribution passages is opened in a side surface of said seat;

said seat has a recessed portion in which said surface of said seat is bent and is inserted into an inner side of said seat to have a tip portion in said seat; and said communication hole is provided in said seat at a position where said tip portion of said recessed portion is provided.

15. The seat air conditioner according to claim 14, wherein:

said seat includes a seat cushion for holding hips and thighs of a passenger seated on said seat and a seat back for holding a back and a waist of the passenger;

said distribution passages extend in said seat cushion in a front-rear direction of said seat cushion; and said distribution passages extend in said seat back in an up-down direction of said seat back.

16. The seat air conditioner according to claim 14, wherein:

said seat includes a seat cushion for holding hips and thighs of a passenger seated on said seat;

said communication hole is provided at a portion of said seat cushion to which seating pressure of the passenger is applied;

said distribution passages extend from said communication hole in a front-rear direction of said seat cushion; and at least one downstream air end of said distribution passages is opened in any one of front and rear side surfaces of said seat cushion.

17. The seat air conditioner according to claim 14, wherein said communication hole is provided at a portion of said seat to which seating pressure of a passenger seated on said seat is applied.

18. The seat air conditioner according to claim 17, wherein said distribution passages extend substantially linearly.

19. The seat air conditioner according to claim 17, wherein:

said seat includes a seat cushion for holding hips and thighs of the passenger;

said communication hole is provided at a portion of said seat cushion to which seating pressure of the passenger is applied;

said distribution passages extend from said communication hole in a front-rear direction of said seat cushion; and at least one downstream air end of said distribution passages is opened in any one of front and rear side surfaces of said seat cushion.

20. The seat air conditioner according to claim 14, wherein said air passage further includes a communication passage causing communication among at least two of said distribution passages.

21. The seat air conditioner according to claim 14, wherein:

in said recessed portion, said seat surface member is bent and inserted into said seat to have opposite surfaces in said seat; and said opposite surfaces of said seat surface member are joined to have a join part at least at said tip portion.

22. A seat air conditioner comprising:

a seat including a shock absorbing member having an air passage through which air flows, and an air permeable seat surface member disposed on a surface of said shock absorbing member;

a blower unit for blowing air toward said seat surface member through said air passage, wherein:

said air passage includes plural distribution passages provided on said surface of said shock absorbing member, an introduction passage into which air blown by said blower is introduced, and a communication hole through which said introduction passage communicates with said plural distribution passages;

said seat has a recessed portion in which said seat surface member is bent and is inserted into an inner side of said seat to have a tip portion in said seat; and said tip portion is disposed in said communication hole.

23. The seat air conditioner according to claim 22, wherein:

in said recessed portion, said seat surface member is approximately vertically inserted into said seat to have overlapped part in said seat; and said tip portion is an inserted join tip of said overlapped part.

* * * * *